United States Patent Office 3,610,056
Patented Oct. 5, 1971

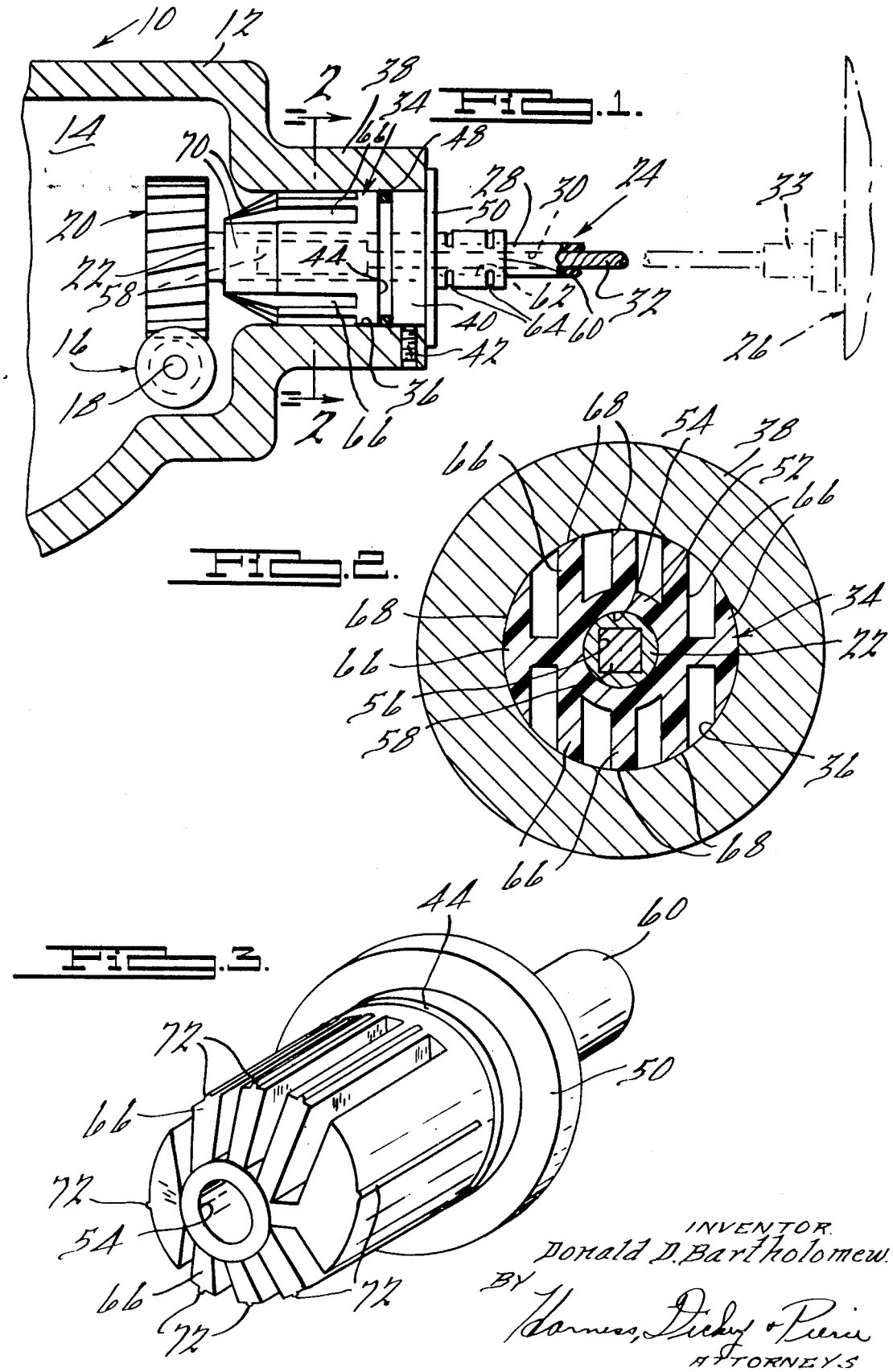

3,610,056
CONNECTOR MEMBER FOR ROTARY DRIVE CABLE
Donald D. Bartholomew, Utica, Mich., assignor to Merit Plastics, Inc., East Canton, Ohio
Filed Mar. 16, 1970, Ser. No. 19,646
Int. Cl. F16c 1/06; F16h 37/00
U.S. Cl. 74—12                                    15 Claims

ABSTRACT OF THE DISCLOSURE

In combination with a vehicular transmission including a housing, a remotely located indicating device, a rotary drive cable for actuating the indicating device in response to operation of the transmission, and means defining a generally cylindrically-shaped access opening in the transmission housing, a connecting member disposed within the opening for maintaining one end of the drive cable in operative relation to the transmission, the member defining a central passage communicable at one end thereof with the interior of the housing and at the opposite end with the cable, and means including a plurality of fin-like elements interposed between the periphery of the opening and the passage defining means for orienting the member within the opening.

BACKGROUND OF THE INVENTION

Automobile and truck speedometer, tachometer and other type drive cables commonly use either a nut and ferrule or a plug type connector for the cable housing connection to the transmission or other cable driving mechanism. The mass and general cylindrical-shape of the family of plug type connectors results in high costs for these parts when they are fabricated of metal. Past attempts to reduce the expense of these parts by taking advantage of the lower overall costs that can be achieved by adopting, for example, injection molded plastics, have been frustrated by the inherent properties of the plastic materials when placed in the particular operating environment. The primary problem relates to the high coefficient of thermal expansion of most plastics, when compared to metal, and the tendency of many high strength plastic materials to swell due to moisture or chemical action. Also heavy plastic sections, when molded, exhibit a tendency to shrink, resulting in sinks being formed and undesirable dimensional variations that are unacceptable in critical tolerance areas.

The present invention is adapted to overcome the aforementioned objectionable characteristics of plug type connector members heretofore known and used through the provision of a novel connector design which permits fabrication thereof out of synthetic plastic materials, such as Delrin, nylon or similar materials which may be injection molded or the like. The connector member of the present invention features a plurality of outwardly projecting spaced apart, resilient deformable fin-like elements which are adapted to contiguously engage the periphery of the access opening in the associated transmission housing and function in a manner so as to positively align the driving components of the associated speedometer cable, regardless of the high temperature environment which exists during operation of the associated vehicle. The aforesaid elements are designed such that when the temperature of the transmission exceeds some predetermined amount, the elements will deform slightly due to their thin cross-sectional shape and their low individual mass, thereby effectively preventing cold flow of the connector member which could result in a "sloppy" fit upon cooling down of the transmission and the attendant possible misalignment of the drive gears associated with the speedometer cable. By vitrue of the fact that the connector member of the present invention utilizes considerably less material than has heretofore been required in plug type connectors, a considerable savings in weight, as well as material is achieved, with the result that an extremely economical, yet highly effective connector is provided.

SUMMARY OF THE INVENTION

This invention relates generally to rotary drive cables and the like and, more particularly, to a new and improved connector member for securing one end of a drive cable, such as a speedometer, tachometer or similar type cable, to an associated operating mechanism, such as a vehicle transmission.

It is accordingly a general object of the present invention to provide a new and improved connector member for use for vehicular speedometer, tachometer cables and the like.

It is a more particular object of the present invention to provide a new and improved connector member which is adapted to be fabricated of a synthetic plastic material or other materials which may be economically fabricated by well known injection molding techniques.

It is another object of the present invention to provide a new and improved connector member of the above character which is adapted to positively maintain precise alignment of various associated drive shafts, gears, and the like even under the most severe operating conditions.

It is a further object of the present invention to provide a new and improved connector member, as above described, that will not be subject to cold flow due to thermal expansion.

It is another object of the present invention to provide a new and improved connector member which is extremely lightweight and is adapted to effect a considerable savings in material cost.

It is yet a further object of the present invention to provide a new and improved connector member which is of a relatively simple design, is convenient to assemble, and will have a long and effective operational life.

Other objects and advantages of the present invention will become apparent from the following detailed description taken in conjunction with the accompanying drawing.

BRIEF DESCRIPTION OF THE DRAWINGS

FIG. 1 is a side elevational view of the speedometer cable connector member of the present invention, as shown in operative association with a typical rotary drive cable assembly and transmission drive gear;

FIG. 2 is a transverse cross-sectional view taken substantially along the line 2—2 of FIG. 1, and FIG. 3 is an elevated perspective view of a slightly modified construction of the speedometer cable connector member of the present invention.

DETAILED DESCRIPTION OF A PREFERRED EMBODIMENT

Referring now in detail to the drawing and in particular of FIG. 1, a vehicular transmission or other similar operating mechanism is representatively designated by the numeral 10 and is shown as comprising a housing 12 defining an internal chamber or compartment 14 within which the operating components of the transmission 10 are operatively disposed. Also located within the compartment 14 is a worm gear member 16 which is rotatably mounted upon a suitable shaft 18 and is adapted to rotate in response to operation of the transmission 10 via a suitable drive means, i.e., drive gears or the like (not shown). The worm gear 16 is meshingly engaged with a suitable pinion gear, generally designated 20, that is mounted on a drive shaft 22 arranged at right angles to the shaft 18 and adapted to be connected in a manner hereinafter to be described with a flexible drive cable assembly, generally designated 24. The assembly 24 is adapted to transmit rotary movement of the shaft 22 to an associated speedometer, tachometer or other operating mechanism, generally designated 26, which is typically located remote from the transmission 10 such as upon the instrument panel of the associated vehicle.

The drive cable assembly 24 may be of any conventional construction well known in the art and may comprise, for example, an exterior hollow tubular housing 28 defining a longitudinally extending internal passage 30 within which are elongated drive cable member 32 is rotatably mounted. By way of example, the cable 32 may, consist of a plurality of individually wound or woven small diameter wires and be connected through a suitable connector or similar type arrangement, representatively designated by the numeral 33, to the input shaft or the like of the operating mechanism 26.

In accordance with the present invention, a new and improved connector member, generally designated by the numeral 34, is provided for operatively connecting the end of the drive cable assembly 24 opposite the housing connector 33 to the drive shaft 22 and hence to the operating components of the transmission 10, whereby the operating characteristics of the transmission 10 will be transmitted via the cable assembly 24 to the speedometer, tachometer, etc. 26. The connector member 34 is preferably fabricated from Delrin, nylon or a similar easily moldable synthetic plastic material and is adapted to be operatively disposed within a generally cylindrically-shaped access opening or bore 36 which is defined by an annular enclosure section 38 formed integrally of the transmission housing 12. As illustrated, the bore 36 is communicable at one end thereof with the interior of the compartment 14 and at the opposite end thereof with the adjacent end of the drive cable assembly 24.

The connector member 34 comprises a main body section 40 which is generally cylindrical in shape and is adapted to be secured within the bore 36 of the transmission housing 12 by suitable clamping means, such as a set screw or the like 42. The body section 40 is also formed with an annular recess or groove 44 which functions to locate and support an O-ring sealing member or the like 48 that provides a fluid-tight seal between the exterior of the transmission housing 12 and the compartment 14, as will be apparent. The axially outer end of the body section 40 is formed with a radially outwardly extending shoulder portion 50 which is adapted to abut against the outer end of the enclosure section 38 upon installation of the member 34 within the bore 36. Extending inwardly or toward the left in FIG. 1 from the main body section 40 is a central annular sleeve section 52 which is formed integrally of the body section 40 and defines an annular bore or passage 54 which extends entirely through the member 34 coaxially of the bore 36. The bore 54 is substantially the same diameter as the shaft 22 and is adapted to rotatably support the shaft 22, as best illustrated in FIGS. 1 and 2. The outer end of the shaft 22 is formed with a generally square cross-section blind bore 56 which is adapted to nestingly receive a complementary-shaped end fitting 58 fixedly secured to the adjacent end of the drive cable 32, whereby to drivingly connect the drive cable 32 with the shaft 22.

As shown in FIG. 1, an annular collar section 60 extends axially outwardly from the right end of the member 34, which section 60 is preferably formed integrally of the member 34 and defines an internal bore 62 which is communicable at the inner end thereof with the bore 54 and is adapted to have the adjacent end of the cable housing 28 received therein. The collar section 60 is adapted to be fixedly secured to the housing 28 by any suitable means, such as, for example, by a staking operation in which a plurality of inwardly projecting grooves 64 are formed in the section 60, whereby to deform the inner periphery of the bore 62 into fixedly secured, i.e., nonrotatable, engagement with the periphery of the housing 28, as is well known in the art.

In accordance with the present invention, a plurality of relatively thin, flexible, deformable fin-like elements, generally designated 66 are interposed between the outer periphery of the central annular sleeve section 52 of the member 34 and the inner periphery of the bore 36. As best seen in FIG. 2, the elements 66 are arranged in generally spaced parallel or radial relation with one another and are all integrally connected at their inner ends to the section 52 of the member 34. The outermost portion of each of the elements 66 defines an axially extending surface 68, all of which surfaces 68 lie along an imaginary cylindrical surface which is common with the periphery of the bore 36, with the result that upon operative installation of the member 34 within the bore 36, the surfaces 68 are contiguously engaged with the periphery of said bore 36 whereby to precisely orient the sleeve section 52, and hence the shaft 22, coaxially of the bore 36. It will be seen that the axially inner ends of each of the fin-like elements 66 is generally tapered inwardly toward the section 52, as seen at 70 in FIG. 1, whereby the element 66 defines a generally conical pilot area which facilitates insertion of the member 34 into the bore 36 upon operative installation thereof.

During operation of the transmission 10, the connector member 34 is adapted to support and align the gear 20 with respect to the associated worm gear 16 so as to assure proper driving engagement therebetween, even during the severest operating conditions. In particular, the plurality of fin-like elements 66 are adapted to function in maintaining proper alignment of the shaft 22 with respect to the enclosure section 38, and specifically to the shaft 18, yet are designed so as to be sufficiently deformable so as to not experience any "cold flow" when the operating temperature of the transmission 10 is relatively high. Instead of cold flowing during such high temperature conditions, the elements 66 will merely deform slightly within the elastic limit of the material from which the member 34 is fabricated so that when the operating temperature of the transmission 10 is reduced somewhat, such as will occur during periods of non-use, the elements 66 will merely resume their original generally planar configuration illustrated herein. This, of course, obviates the possibility of a "sloppy" fit occurring between the member 34 and the bore 36 which would very likely result in improper alignment of the gear 20 with respect to the associated gear 16. Thus, the plurality of elements 66, due to their low individual mass and relatively thin configuration, serve to defeat the inherent temperature swelling or expansion which has heretofore been encountered in prior known connector members. An additional advantage, of course, resides in the large reduction of weight and attendant reduction in the quantity of material required in the fabrication of the member 34, which considerably reduces the manufacturing costs thereof.

FIG. 3 illustrates a slightly modified embodiment of the conector member shown in FIGS. 1 and 2, wherein each of the surfaces 68 of the elements 66 is provided with a longitudinally extending, radially outwardly projecting rib portion 72. The rib portions 72 are formed integrally of the member 34 and actually result in the overall size of the connector member being slightly greater than the diameter of the bore 36, with the result that the rib portions 72 will cold flow or be deformed upon installation of the member 34 within the bore 36. This provides an effective "line-to-line" fit or engagement between the radially outermost portions of the elements 66 and the periphery of the bore 36, whereby to maximize to the extreme the proper orientation of the member 34 within the bore 36 and thus assure extremely precise alignment of the gear 20 with respect to the associated gear 16.

While it will be apparent that the preferred embodiments illustrated herein are well calculated to fulfill the

I claim:

1. In combination with a rotary drive cable for transmitting the operating characteristics between a first operating mechanism and a second operating mechanism,
   means defining a generally cylindrically shaped access opening communicable at one end thereof with one of the operating mechanisms, and
   a connector member disposed within said opening and adapted to maintain one end of said drive capable in operating relation to said one mechanism,
   said member defining a passage within which said one end of said drive cable is aligned and including a plurality of generally fin-like elements disposed in confronting relation with the periphery of said opening and adapted to orient said member therein.

2. The combination as set forth in claim 1 wherein said connector member is fabricated of a synthetic plastic material.

3. The combination as set forth in claim 1 wherein said fin-like elements, are formed integrally of said member.

4. The combination as set forth in claim 3 wherein said fin-like elements are of a relatively thin, deformable character and are engageable with the periphery of said access opening for aligning said member therein.

5. The combination as set forth in claim 3 wherein said member comprises a central sleeve section defining said passage and having said fin-like elements extending outwardly therefrom.

6. The combination as set forth in claim 5 which includes a drive shaft having a portion thereof disposed within said passage and engageable with one end of said drive cable internally thereof.

7. The combination as set forth in claim 3 wherein each of said fin-like elements comprises an outwardly projecting rib portion adapted to cold flow upon insertion of said member into said opening in order to provide for a contiguous line-to-line contact between the periphery of said opening and said elements.

8. In combination with a vehicular transmission including a housing, a remotely located indicating device, and a rotary drive cable for actuating the indicating device in response to operation of the transmission,
   means defining a generally cylindrically shaped access opening in the transmission housing,
   a connector member disposed within said opening for maintaining one end of the drive cable in operative relation to said transmission,
   said member defining a central passage communicable at one end thereof with the interior of said housing and at the opposite end with said cable, and
   means including a plurality of fin-like elements interposed between the periphery of said opening and said passage defining means for orienting said member within said opening.

9. The combination as set forth in claim 8 wherein said fin-like elements are of a relatively thin, deformable character and are engageable with the periphery of said access opening for aligning said member therein.

10. The combination as set forth in claim 8 wherein said member comprises a central sleeve section defining said passage and having said fin-like elements extending outwardly therefrom.

11. The combination as set forth in claim 8 wherein one end of said member defines a relatively tapered portion defining a pilot area to facilitate insertion of said member into said access opening.

12. The combination as set forth in claim 8 wherein each of said fin-like elements comprises an outwardly projecting rib portion adapted to cold flow upon insertion of said member into said opening in order to provide for a contiguous line-to-line contact between the periphery of said opening and said elements.

13. The combination as set forth in claim 8 wherein said member comprises an externally threaded body portion adapted to be threadably received within said opening, an annular sleeve section formed integrally of said body portion and having said fin-like elements integrally formed therearound and defining said central passage, and which includes drive means rotatably disposed within said passage and adapted for connection with said drive cable interiorly thereof.

14. The combination as set forth in claim 8 wherein said member is fabricated of a synthetic polymeric material.

15. The combination as set forth in claim 14 wherein said material is taken from the group of plastics including Delrin and nylon.

References Cited

UNITED STATES PATENTS 3,247,729   4/1966   Stadelmann _____ 74—12

FOREIGN PATENTS 884,593   12/1961   Great Britain _____ 64—4

LEONARD H. GERIN, Primary Examiner

U.S. Cl. X.R.

64—4